United States Patent [19]

Foster et al.

[11] Patent Number: 4,591,665

[45] Date of Patent: May 27, 1986

[54] METHOD AND APPARATUS FOR PROVIDING CALL TRACING SERVICE

[75] Inventors: Robert W. Foster, Glen Ellyn; Rosanna M. Lottes; Grant E. Swinehart, both of Naperville, all of Ill.

[73] Assignee: AT&T Bell Laboratories, Murray Hill, N.J.

[21] Appl. No.: 512,956

[22] Filed: Jul. 12, 1983

[51] Int. Cl.[4] .......................... H04M 1/57; H04Q 3/72
[52] U.S. Cl. .................................... 179/18 FH; 179/5.5
[58] Field of Search ............... 179/18 FH, 5.5, 27 DB

[56] References Cited

U.S. PATENT DOCUMENTS

| | | | |
|---|---|---|---|
| 3,546,389 | 12/1970 | DeRaedt et al. | 179/18 FH |
| 4,277,649 | 7/1981 | Sheinbein | 179/18 B |
| 4,310,726 | 1/1982 | Asmuth | 179/18 B |
| 4,355,207 | 10/1982 | Curtin | 179/18 FC |
| 4,445,001 | 4/1984 | Bertoglio | 179/17 A |

FOREIGN PATENT DOCUMENTS

| | | | |
|---|---|---|---|
| 0059469 | 9/1982 | European Pat. Off. | 179/18 FH |
| 0076646 | 4/1983 | European Pat. Off. | |
| 2806234 | 8/1979 | Fed. Rep. of Germany | 179/5.5 |
| 2820971 | 11/1979 | Fed. Rep. of Germany | 179/18 FH |
| 3034986 | 3/1982 | Fed. Rep. of Germany | 179/5.5 |
| 100779 | 7/1980 | Japan | 179/5.5 |
| 31255 | 2/1982 | Japan | 179/18 FH |
| 45766 | 3/1982 | Japan | 179/18 FH |
| 0141066 | 8/1983 | Japan | 179/18 FH |
| 1118589 | 7/1968 | United Kingdom | |
| 2014825 | 8/1979 | United Kingdom | 179/5.5 |

Primary Examiner—Thomas W. Brown
Attorney, Agent, or Firm—Richard J. Godlewski

[57] ABSTRACT

For use with a telephone system having a communications terminal and serving a plurality of stations, method and apparatus is disclosed for providing a customer-originated call tracing service on a per call basis. Responsive to a call from a calling station to a called station, a memory dedicated to the called station stores the directory number of the calling station. An indicator bit associated with the memory designates the stored directory number as that of a "calling" station. Receiving, for example, a nuisance or obscene call, the customer at the called station enters a predetermined access code after the call to send the designated directory number of the calling station as well as the called station directory number to the communications terminal for subsequent follow up by appropriate personnel. Several calling station directory numbers may be stored in the memory for subsequent display at the called station. In such case, the called customer may first choose the directory number of the nuisance caller, particularly, when the called customer receives a large number of calls during a relatively short period of time.

20 Claims, 7 Drawing Figures

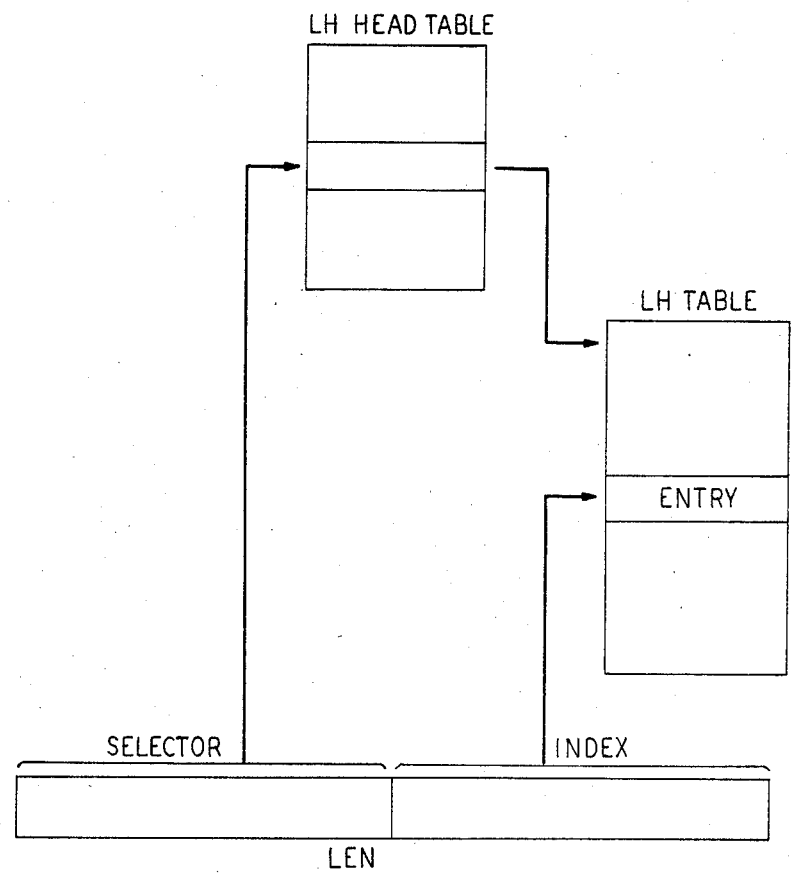
FIG. 6
LINE HISTORY TABLE DATA STRUCTURE
FIG. 7
LINE HISTORY TABLE ENTRY LAYOUT
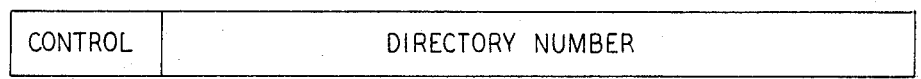

METHOD AND APPARATUS FOR PROVIDING CALL TRACING SERVICE

CROSS-REFERENCE TO RELATED APPLICATIONS

This application is related to the applications of R. M. Lottes et al., entitled "Method and Apparatus for Providing a Plurality of Special Services", Ser. No. 513,079, and C. A. Doughty, entitled "Method and Apparatus for Sending a Data Message to a Selected Station during a Silent Interval between Ringing", Ser. No. 512,955 (now U.S. Pat. No. 4,551,581), and "Method and Apparatus for Displaying at a Selected Station Special Serice Information during a Silent Interval between Ringing", Ser. No. 513,080, all filed concurrently on July 12, 1983, with this application.

TECHNICAL FIELD

This invention relates to communication systems serving a plurality of stations and particularly to the provision of call tracing service for identifying calling stations.

BACKGROUND OF THE INVENTION

Historically, tracing a call through a telephone switching system to identify the calling station has typically included the assistance of telephone company personnel. Thus, a party receiving, for example, a nuisance call would have telephone company personnel notified to trace the identity of the calling station while the nuisance call continued. With older telecommunication systems, this requirred telephone company personnel to first translate the called station's directory number to an equipment location and then physically trace the call connection through the switching system to the calling station equipment location. When associated with a calling station connected directly to the same switching system, the equipment location can easily be translated to a local calling station directory number. Alternatively, when the equipment location is associated with a trunk to a distant switching system, personnel in the distant switching system office would have to trace the call to the calling station or to still another office until the calling station is identified. As a result, the call tracing process may take a considerable period of time. Of course, the nuisance caller is not going to continue the call for any extended period of time particularly if the caller is trying to avoid detection.

Stored program-controlled switching systems eliminate the need of physically tracing a call through an office; however, the problem of notifying telephone company personnel to trace a nuisance call is still required. Typically, the switching system program may be modified to identify all calls to a particular called station. Similarly, specialized equipment at the telephone office may be utilized to identify nuisance callers; however, again, the need for arranging for this type of tracing equipment in advance of the nuisance call is required. Nevertheless, call tracing may still be thwarted when an interoffice nuisance call is made.

Display station sets offer some relief to the problem of having to arrange for call tracing in advance. Here, the station set which is usually associated with a private branch exchange displays the intraexchange calling station identity when the called station set is rung. However, the problem of identifying a nuisance caller is likewise thwarted with an interoffice call. Furthermore, the problem of generating a permanent record for the authorities also arises unless prior arrangements with telephone company personnel have been made in advance. Even with a record of all calls to a particular called station, the problem of distinguishing which calls are nuisance presents itself unless the nuisance caller uses the same calling station.

SUMMARY OF THE INVENTION

The foregoing problems are solved and a technical advance is achieved by method and apparatus for tracing calls through a telephone switching office by sending the calling station identity to a communications terminal in response to a predetermined code entered at the called station after the termination of a call. Responsive to a call from a calling to a called station, the identity of the calling station is stored in a memory associated with the called station. The stored identity of the calling station is sent to the communications terminal in response to a predetermined code entered at the called station.

In one illustrative embodiment of the invention, the identity of the called station as well as the stored identity of the calling station is sent to the communications terminal. Thus, the identities of both the calling and called stations may be sent to the authorities when a code designating a call as nuisance or obscene is entered at the called station after the call is completed.

In accordance with one feature of the invention, the identity of the calling station is indicated at the called station.

In accordance with another feature of the invention, the identity of a calling station is stored and designated as that of a calling station. In response to a predetermined code entered at the called station after the termination of the call, the designated identity is sent to the communications terminal.

In accordance with yet another feature of the invention, the identity of each one of a plurality of calling stations is stored and designated as that of a calling station. In response to a predetermined code entered at the called station, the designated identity of a calling station is chosen per a predetermined algorithm and sent to the communications terminal.

BRIEF DESCRIPTION OF THE DRAWING

The invention may be better understood from the following detailed description when read with reference to the drawing in which:

FIG. 6 discloses the line history word data structure of the call store memory in FIG. 1 for accessing an entry in the line history word table; and FIG. 7 is the memory layout of a line history word table entry in the call store memory of FIG. 1.

DETAILED DESCRIPTION

Figure 1:
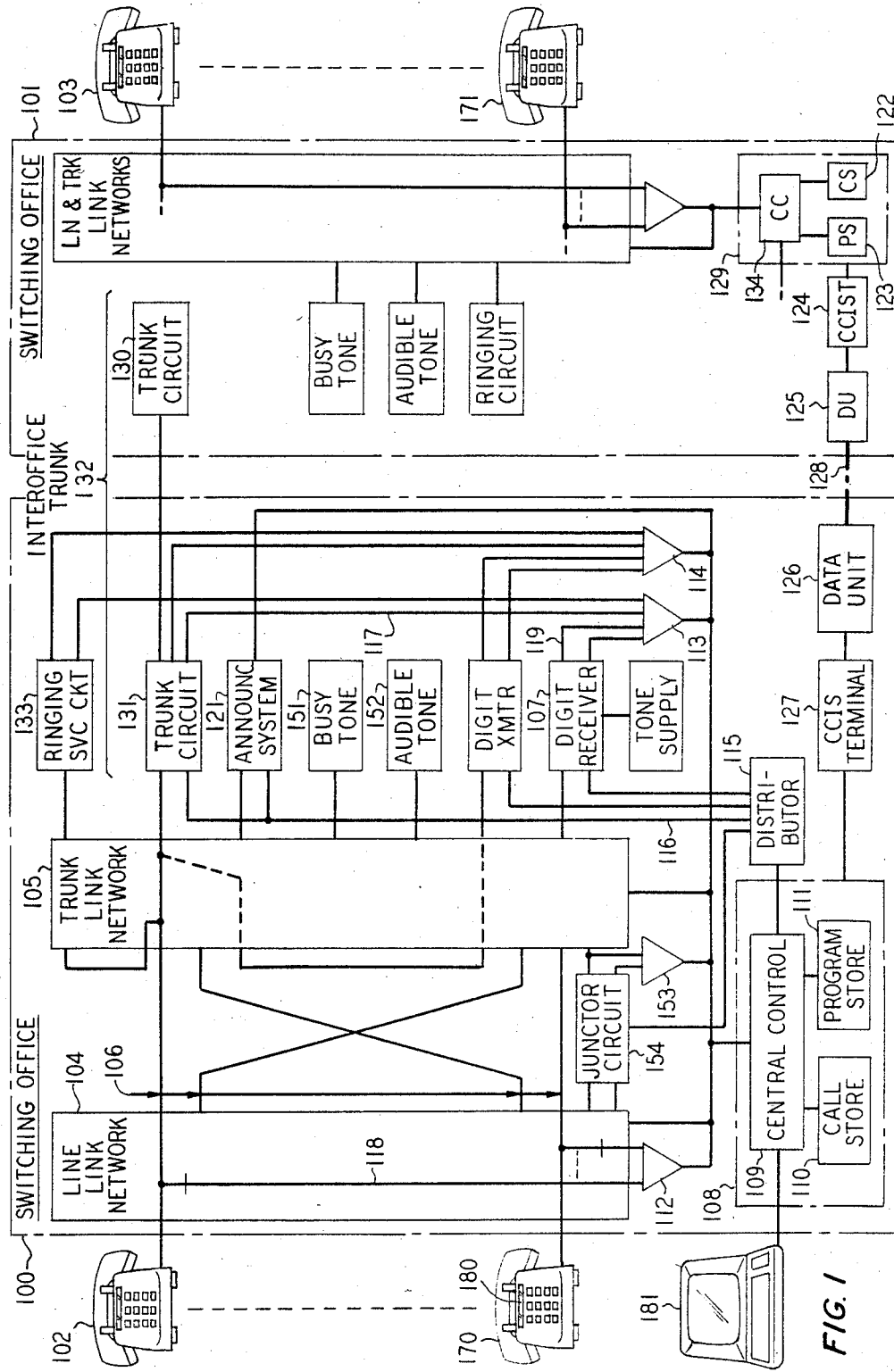
FIG. 1 shows, in block diagram form, a typical telephone switching network having two stored program-controlled switching systems interconnected by trunks and an interoffice signaling system.

FIG. 1 shows a block diagram of a typical switching network comprising telephone switching offices 100 and 101 which serve a plurality of customer stations such as 102, 103, 170 and 171.

By way of example, each of the telephone switching offices is suitably an electronic program-controlled switching system of the type disclosed in U.S. Pat. No. 3,570,008 to R. W. Downing et al. of Mar. 9, 1971, and also disclosed in *The Bell System Technical Journal,* Vol. 43, No. 5, Parts 1 and 2, September, 1964. These citations may be referred to for a more comprehensive understanding of the construction and operation of the switching system, but a brief description will be given herein to illustrate how the invention functions within a switching system.

Switching office 100 comprises line link network 104, trunk link network 105, and a stored program-controlled processor 108. Line link network 104 provides the terminations for customer stations, such as 102 and 170, while trunk link network 105 provides the terminations for trunks such as interoffice trunk 132 which is terminated at switching office 100 via trunk circuit 131. The trunk link network also provides terminations for miscellaneous other circuits such as digit receiver 107, announcement system 121, etc. The line and trunk link networks are connected via wire junctors 106 to permit the interconnection of lines, trunks, and service circuits for call processing under the control of processor 108. Line link network 104 is also interconnected by junctor circuits such as 154 to complete and supervise intraoffice calls between stations such as 102 and 170.

The majority of the logic, control, storage, supervisory, and translation functions required for the operation of this system are performed by central processor 108. A typical central processor suitable for use in the illustrative switching system is described in *The Bell System Technical Journal,* Vol. 56, No. 2, February 1977. Processor 108 is a data processing facility and can be functionally divided into central control 109, call store 110, and program store 111 plus maintenance apparatus which has not been shown to simplify the drawing. Call store 110 is a memory for storing translation and routing information in addition to temporary information relating to calls in progress and special services. As will be described in more detail hereinafter, this temporary information includes the busy/idle status of circuits and stations, calling/called station directory numbers, etc.

In accordance with this invention, call store 110 also includes memory dedicated to each customer station for storing on a per call basis information which is related to a calling station. This information includes the identity of the calling station such as the directory number and may also include the time of day, type of equipment, etc. In addition, the memory dedicated to each customer station also includes a station indicator for designating the information as that of either a "calling" or a "called" station. For example, responsive to a call from calling station 102 to called station 170, the station indicator for called station 170 is set to "calling" station such that call tracing service or other special services may be subsequently initiated. Similarly, the station indicator for calling station 102 is set to "called" station such that special features associated with a calling station may be initiated. The indicator may also be extended to include various combinations of factors such as, for example, type of party (calling/called), group (PBX/Centrex), or equipment; status of party, group, or equipment; screening treatment; etc. Thus, a large selection of additional services may also be offered at a customer station. However, for the purposes of this illustrative embodiment, call store memory is dedicated to each customer station for storing on a per call basis, the calling station directory number. Furthermore, the memory also includes a station line indicator bit for designating the stored directory number as that of either a "calling" or a "called" station.

Program store 111 is a memory for storing the program instructions which direct the central control to sequentially perform its many functions.

Central control 109 is the information processing unit of the system and executes the program instructions listed in program store 111 using information temporarily stored in call store 110.

Processor 108 interfaces with lines, trunks, and service circuits via scanners 112–114 and 153 and distributor 115. Distributor 115 responds to an order over a bus system from the central control to apply pulses to distribution points connected to peripheral units of equipment. For example, in response to an appropriate order, distributor 115 signals over conductor 116 to actuate apparatus such as a relay in trunk circuit 131.

Scanners 112–114 and 153 are used to gather information for the central control by monitoring leads connected to the various peripheral units and customer stations. Thus, when a trunk circuit such as 131 changes state as a result of a seizure from a distant originating switching office, a signal is transmitted via conductor 117 to scanner 113. Similarly, scanner 113 recognizes changes of state in digit receiver 107 via conductor 119 in order to ascertain digits received from lines or trunks. Likewise, scanners 112 and 153 are used to recognize the busy/idle (off-hook/on-hook) condition of customer stations such as 102 and 170. Periodically, the scanners are addressed by central control 109 over a bus system to determine the state of the peripheral units and customer stations.

In addition, processor 108 interfaces with communications terminal 181 for sending and receiving various types of administrative messages which may include, for example, the directory numbers of the calling and called stations associated with a call. These call tracing service messages may also be sent to a customer station which is connected to a processor-controlled service circuit.

Switching office 101 basically comprises the same units of equipment as switching office 100 and need not be described herein.

Switching offices 100 and 101 are connected together and to other switching offices via a common channel interoffice signaling (CCIS) system comprising terminals 124 and 127, data units 125 and 126, and data link 128. The signaling system provides high speed data transmission facilities between the central processors of offices 100 and 101 to carry all signaling, address, and network control information independently of the interoffice talking paths. For instance, this information includes the identity of trunks used by the customers as well as calling and called party identification.

A typical example of a common channel interoffice signaling system which can be used in the present embodiment is disclosed in *The Bell System Technical Journal* Vol. 57, No. 2, February, 1978.

To illustrate the operation of this novel arrangement for providing call tracing service, let it be assumed that the customers at each of the stations connected to switching office 100 in FIG. 1 have been provided with this service. The ensuing description wherein each customer is provided with this customer originated call tracing service will be made with reference to the block diagram of FIG. 1 and the flow diagram of FIGS. 2-4.

The method for providing call tracing service with this novel arrangement may be divided into two phases: storage and reporting. In the storage phase, the directory number of the calling station is stored in a table entry which is associated with the called station and is referred to as the line history. Similarly, the directory number of the called station is stored in a line history table entry which is associated with the calling station. Along with each stored directory number, an associated station indicator bit is set to designate the stored directory number as that of either a "calling" or a "called" station. The stored directory number of the calling station along with the indicator bit are then used for sending the stored directory number to appropriate personnel when the call has been, for example, obscene.

After the obscene call is terminated, the reporting phase is implemented by the customer entering a predetermined access code at the called station. Responsive to this access code, the stored directory number of the calling station is sent to a communications terminal for subsequent follow-up by appropriate personnel. For most cases, the line history table entry need only be a single memory location to store one calling station directory number. However, when a station is provided with a number of special services or receives a large number of calls, a line history table entry capable of storing multiple directory numbers is desirable. As a result, the customer may first choose the directory number of the nuisance caller before sending the number to the communications terminal.

Figure 2:
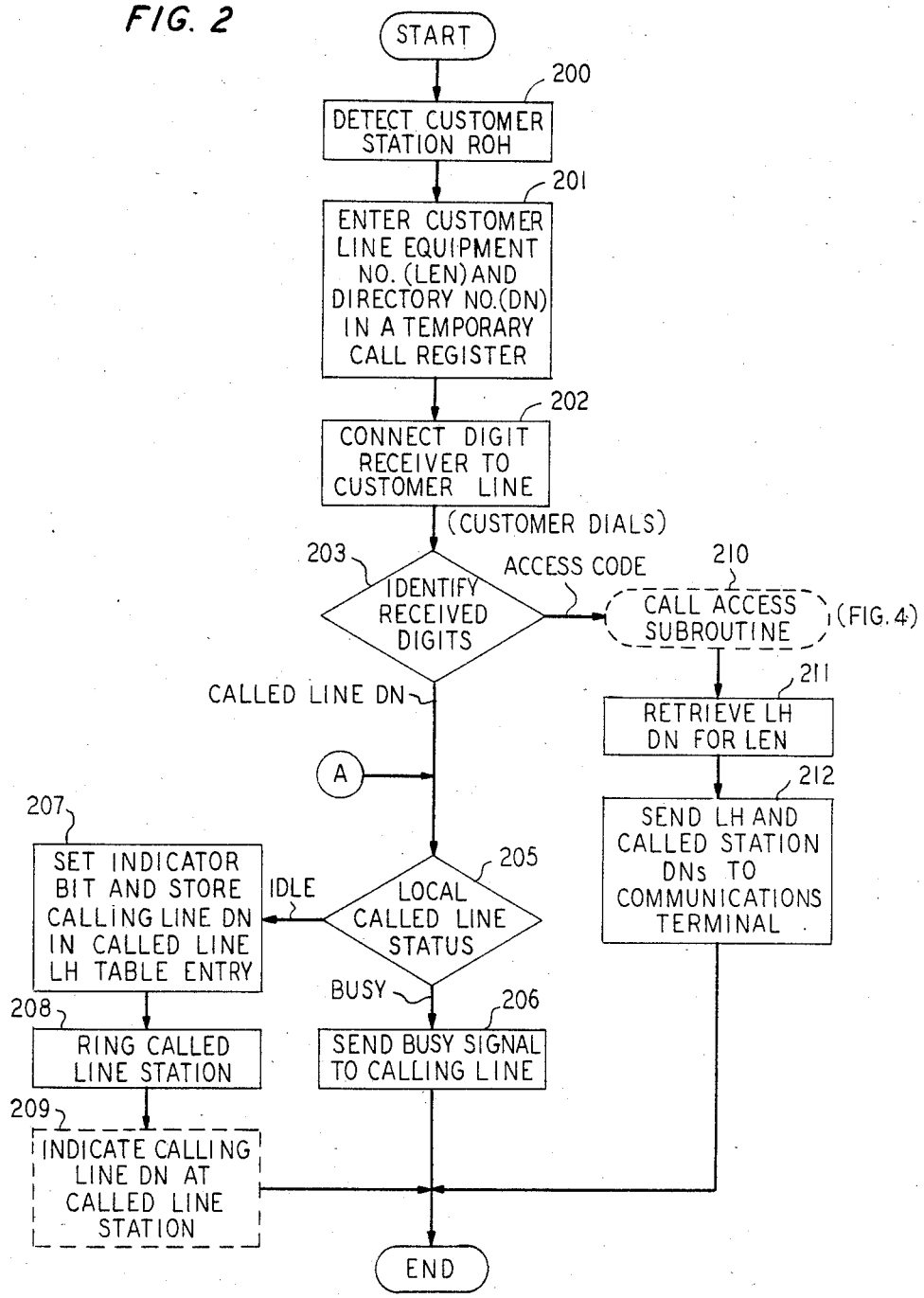
FIGS. 2–4 disclose flow diagrams of the sequence of operations of the telephone switching systems shown in FIG. 1 for providing a call tracing service.

The storage phase of the arrangement may be implemented in one of two manners. First, the customer at station 102 may lift his/her receiver to place a regular telephone call. As shown in FIG. 2 of the flow diagram, scanner 112 recognizes the receiver of the calling station off hook (ROH) (block 200) and transmits this information to central control 109 which determines that this is a new request for service. Having selected a temporary call register in call store 110, central control 109 enters call processing information such as line equipment number (LEN) and directory number (DN) of tne calling station into the temporary call register (block 201).

Figure 5:
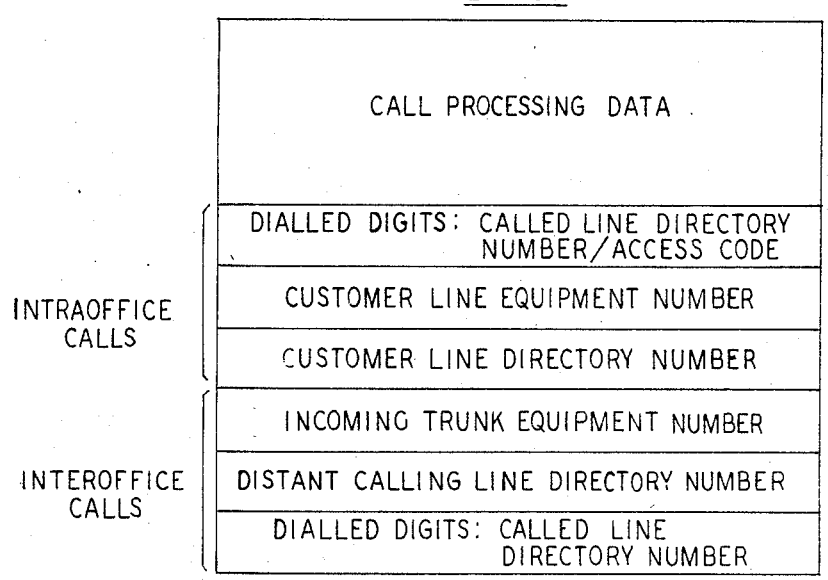
FIG. 5 shows the memory layout of a temporary call register in the call store of a telephone switching system in FIG. 1.

Shown in FIG. 5 is the layout of a temporary call register in call store 110. This register is used by the central control to temporarily store call processing information. This information includes well-known general call processing data as well as specific data for intraoffice and interoffice calls. As indicated for intraoffice calls, this specific data includes the dialed digits and the equipment and directory numbers of the calling station. For interoffice calls, this specific data includes the equipment number of the incoming trunk as well as the dialed digits. As interoffice call completion progresses, the distant calling line directory number is also included.

Returning to FIG. 2, it can be seen that digit receiver 107 is then connected to station 102 (block 202) via one of junctors 106. Dial tone is returned to the station, and the customer thereat dials or keys the directory number of the called station. Central control 109 reads the dialed digits received by digit receiver 107 via scanner 113 and stores them in the temporary call register. Under the control of a digit analysis program and through tne use of translation tables in call store 110, central control 109 determines the disposition of the call. When the received digits correspond to an access code (block 203), central control 109 causes the arrangement to implement the reporting phase.

Recognizing that the dialed digits correspond to the directory number of a local called line such as that of station 170 (block 203), central control 109 determines tne busy/idle status of called station 170 via scanner 112 (block 205). When called station 170 is in a busy condition, busy tone circuit 151 sends a busy signal to calling station 102 (block 206). Recognizing that called station 170 is in an idle condition, central control 109 stores the directory number of calling station 102 in the line history table entry associated with called station 170 and sets the indicator bit to "calling" station (block 207). The call then proceeds in a normal manner. Audible tone circuit 152 sends an audible ringing signal to calling customer station 102, and ringing service circuit 133 rings called station 170 (block 208).

When called station 170 has been provided with well-known call waiting service and is in a busy condition, the call is handled as if the called line were in an idle condition. Appropriately, audible ringing tone is sent to customer station 102, and a call waiting tone is sent to busy called station 170. In addition, the directory number of calling station 102 may be displayed in display 180 of called station 170 (phantom block 209) which may be any well-known and commercially available LED or the like display station set. A display arrangement suitable for use with illustrative switching office 100 is described in the copending application of C. A. Doughty, entitled "Method and Apparatus for Displaying at a Selected Station Special Service Information during a Silent Interval between Ringing". Alternatively, the directory number of the calling station may be sent to station 170 in the form of a message from announcement system 121.

As depicted in the line history table data structure of FIG. 6, the line history table is accessed using the line equipment number of the calling station which is stored in the temporary call register. As shown, a portion of the line equipment number is used to select the memory address of the particular line history table in the line history (LH) head table. With the beginning address of the selected line history table, the remaining portion of the line equipment number is used to index the entry of the table associated with the calling station.

The layout of a single memory location line history table entry is depicted in FIG. 7. As shown, the single location entry includes control and directory number fields. The control field includes a station indicator bit which designates the directory number stored in the line history table entry as that of either a "calling" or a "called" station. Also included in the control field is a privacy bit to prevent disclosure of certain station numbers. Although shown as only a single location entry, the line history table entry for each associated customer in a switching office may include additional locations fashioned, for example, in a well-known push-down stack arrangement. These additional locations may be used for storing information such as time of call; type of equipment; etc. Similarly, each line history table entry may include two push-down stacks for separately storing called and calling station directory numbers. These multiple memory location table entries may be used with multiple access codes to enhance the novel arrangement which will be described hereinafter. These calling and called directory numbers associated with each customer station are then utilized when in the reporting phase of the novel arrangement.

Figure 3:
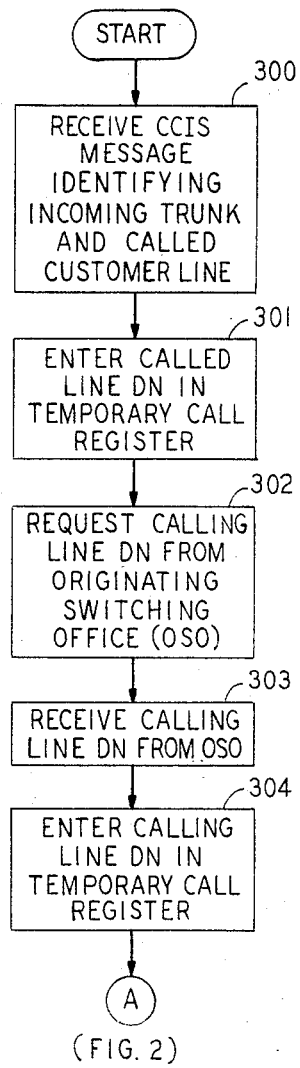

Depicted in FIG. 3 is the other manner in which to implement the storage phase when called station 170 receives an incoming interoffice call. Here, switching office 100, now a terminating office, receives a CCIS initial address message identifying the interoffice trunk and the directory number of the called customer station (block 300). For this example, let it be assumed that calling station 103 at originating switching office 101 wishes to connect to called station 170 at terminating switching office 100. The call is initiated by originating switching office 101 by sending a well-known CCIS banded-type signaling service request message to terminating switching office 100. From this CCIS request message, processor 108 enters the called line directory number in a temporary call register (block 301). Processor 108 then translates the called line directory number to a line equipment number for the called station. While completing the call, central control 109 also composes a CCIS message requesting the directory number of the calling station from the originating switching office (block 302). Alternatively, the calling line directory number may be included in the initial service request message.

At originating switching office 101, the CCIS request message is processed to ascertain the directory number of calling station 103. The directory number along with interoffice trunk number 132 is transmitted via the CCIS system to terminating switching office 100. Receiving the calling line directory number (block 303), central control 109 enters the calling line directory number in the temporary call register associated with the call (block 304). During normal call processing, central control 109 determines the busy/idle status of the local called station as depicted in decision block 205 of FIG. 2. When the called customer station is in a busy state, an audible busy signal is sent to calling station 103 (block 206). When called station 170 is in an idle condition or has been provided with call waiting service, central control 109 stores the directory number of the calling station in the temporary call register into the line history table entry associated with the called line and sets the indicator bit to "calling" station (block 207). Ringing service circuit 133 provides ringing current to called station 170 (block 208), and audible tone circuit 152 sends an audible ringing signal to calling station 103. As previously suggested, the directory number of calling station 103 may also be indicated at called station 170 by the use of an LED or the like display station set.

Thus, when a call is placed to a called station from a calling station in the same or another office, the calling station directory number is stored in the line history table entry associated with the called station. In addition, the station indicator bit is set to "calling" station to designate the stored directory number as that of a calling station. As previously mentioned, the line history table entry for a customer station may comprise a single memory location or any number of memory locations each for storing a calling directory number.

The reporting phase of the call tracing service is implemented when a customer having received, for example, an obscene call wants to send the directory number of the calling station to appropriate personnel for subsequent follow-up. Thus, the customer at called station 170 implements the reporting phase of the call tracing service by lifting his/her receiver after terminating the obscene call in a standard manner and keying a call tracing service access code.

This access code may be a special 2 or 3 digit number and, in order to distinguish it from other codes, could include the star (*) or pound (#) found on a telephone key set. A single code may be provided to retrieve stored directory numbers designated as "calling" station per a predetermined algorithm such as, for example, the order in real time in which the directory numbers were designated as "calling" stations.

As shown in operation blocks 200 through 202 of FIG. 2, scanner 112 recognizes the receiver of station 170 off hook (ROH) and sends this information to central control 109 which enters the line equipment and directory numbers of station 170 in a temporary call register of call store 110. Central control 109 then connects digit receiver 107 to the customer station, and the customer there keys the call tracing service access code which indicates that the stored directory number of the calling station be sent to the appropriate personnel for follow up. Let it be assumed that the line history table entry associated with the customer station comprises a single memory location for storing called and calling line directory numbers. A table entry having multiple memory locations will be described hereinafter (phantom call block 210).

The illustrated single location table entry arrangement, again, requires only one access code. Upon identifying this code (block 203), central control 109 retrieves the designated "calling" station directory number stored in the line history table entry associated with the called station (block 211) and sends it along with the called station's directory number to communications terminal 181 (block 212). At terminal 181, the two directory numbers are displayed and a record made thereof for follow up by appropriate personnel.

Figure 4:
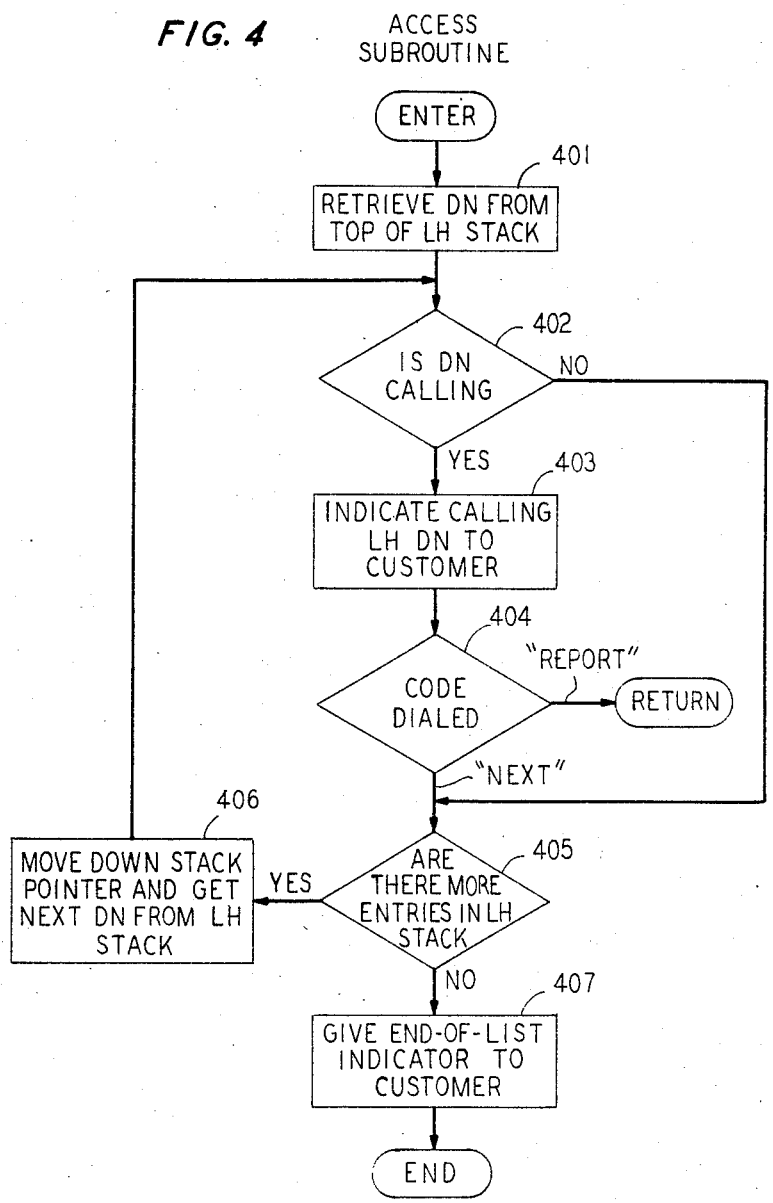

As previously mentioned, multiple memory locations for the line history table entry associated with a customer may be provided to store a number of calling and called directory numbers in a push-down stack arrangement. In such case, an access subroutine as shown in FIG. 4 may be utilized to choose a "calling" station based on the station indicator and then display the chosen number before sending it to the communications terminal. After identifying the received digits from the customer as an access code (decision block 203 in FIG. 2), the access subroutine is called (phantom block 207). As depicted in block 401 of FIG. 4, central control 109 retrieves the called/calling directory number and associated indicator bit from the top of the line history stack. The indicator bit is examined to determine whether or not the stored directory number is "calling" (block 402). When the directory is "calling", the directory number is indicated to the requesting customer (block 403). Again, the calling directory number may be indicated to the customer in the form of a message from announcement system 121 or by a display at the customer station set. The requesting customer then decides whether to report the calling directory number or select the next calling directory number in the stack by entering an appropriate code (block 404). When the directory number is not that of a calling station, central control retrieves the next entry in the line history stack when additional entries are available (blocks 405 and 406) or gives an end of list indication to the customer (block 407).

It is to be understood that the above-described method and apparatus is merely an illustrative embodiment of the principles of this invention and that numerous other methods arrangements may be devised by those skilled in the art without departing from the spirit and scope of the invention. In particular, one skilled in the art may easily assign any number of different access codes or establish separate calling and called pushdown stack locations for line history table entries. Additional services may be offered including, for example, sending the identity of a called station to a communications terminal in response to a code entered at the calling station.

What is claimed is:

1. For use with a telephone system having a communications terminal and serving a plurality of stations, a method for providing a call tracing service, comprising the steps of:
    responsive to a call from a calling one to a called one of said stations, storing the identity of said calling station in a memory associated with said called station; and
    responsive to a predetermined code entered at said called station after the termination of said call, sending the stored identity of said calling station to said communications terminal.

2. The method set forth in claim 1 wherein said method further comprises the step of indicating the identity of said calling station at said called station.

3. The method set forth in claim 1 wherein said method further comprises the step of responsive to said predetermined code entered at said called station, sending the identity of said called station to said communications terminal.

4. For use with a telephone system having a communications terminal and serving a plurality of stations, apparatus for providing a call tracing service, comprising:
    responsive to a call between a calling one and a called one of said stations, means associated with said called station for storing the identity of said calling station; and
    responsive to the identity of said calling station being stored in said storing means and to a predetermined code entered at said called station after the termination of said call, means for sending the stored identity of said calling station to said communications terminal.

5. The apparatus in accordance with claim 4 in which said apparatus further comprises means for indicating the identity of said calling station at said called station.

6. The apparatus in accordance with claim 4 in which said means for sending the stored identity of said calling station is also responsive to said predetermined code for sending the identity of said called station to said communications terminal.

7. For use with a telephone system having a communications terminal and serving a plurality of stations, a method for providing a call tracing service, comprising the steps of:
    responsive to a call between a calling one and a called one of said stations, storing the identity of said calling station in a memory associated with said called station;
    designating the stored identity of said calling station as that of a calling station; and
    responsive to a predetermined code entered at said called station after the termination of said call, sending the designated identity of said calling station to said communications terminal.

8. The method set forth in claim 7 wherein said method further comprises the step of indicating the identity of said calling station at said called station.

9. The method set forth in claim 7 wherein said method further comprises the step of responsive to said predetermined code entered at said called station, sending the identity of said called station to said communications terminal.

10. For use with a telephone having a communications terminal and serving a plurality of stations, apparatus for providing a call tracing service, comprising:
    responsive to a call between a calling one and a called one of said stations, means associated with said called station for storing the identity of said calling station;
    responsive to the identity of said calling station being stored in said storing means, means for designating the stored identity of said calling station as that of a calling station; and
    responsive to a predetermined code entered at said called station after the termination of said call, means for sending the designated identity of said calling station to said communications terminal.

11. The apparatus in accordance with claim 10 in which said apparatus further comprises means for indicating the identity of said calling station at said called station.

12. The apparatus in accordance with claim 10 in which said apparatus further comprises means responsive to said predetermined code entered at said called station for sending the identity of said called station to said communications terminal.

13. For use with a telephone system having a communications terminal and serving a plurality of stations, a method for providing a call tracing service, comprising the steps of:
    responsive to a call between a first calling one and a called one of said stations, storing the identity of said first calling station in a memory associated with said called station;
    designating the stored identity of said first calling station as that of a calling station;
    responsive to a call between a second calling one of said stations and said called station, storing the identity of said second calling station in a memory associated with said called station;
    designating the stored identity of said second calling station as that of a calling station;
    responsive to a predetermined code entered at said called station, choosing per a predetermined algorithm the designated identity of one of said first and second calling stations; and
    sending said chosen identity to said communications terminal.

14. The method set forth in claim 13 wherein said method further comprises the step of indicating the identities of said first and second calling stations at said called station.

15. The method set forth in claim 13 wherein said method further comprises the step of indicating said chosen identity at said called station.

16. The method set forth in claim 13 wherein said method further comprises the step of responsive to said predetermined code entered at said called station, sending the identity of said called station to said communications terminal.

17. The method set forth in claim 13 wherein said predetermined algorithm is based on which identity of said first and second calling stations was designated later in time.

18. For use with a telephone system having a communications terminal and serving a plurality of stations, apparatus for providing a call tracing service, comprising:
- responsive to a call between a first calling one and a called one of said stations, means associated with said called station for storing the identity of said first calling station;
- responsive to the identity of said first calling station being stored, means for designating the stored identity of said first calling station as that of a calling station;
- responsive to a call between said called station and a second calling one of said stations, means associated with said called station for storing the identity of said second calling station;
- responsive to the identity of said second calling station being stored, means for designating the stored identity of said second calling station as that of a calling station;
- responsive to a predetermined code entered at said called station, means for choosing per a predetermined algorithm the designated identity of one of said first and second calling stations; and
- means for sending said chosen identity to said communications terminal.

19. The apparatus in accordance with claim 18 wherein said apparatus further comprises means for indicating the identities of said first and second calling stations at said called station.

20. The apparatus in accordance with claim 18 wherein said apparatus further comprises means responsive to said predetermined code entered at said called station for sending the identity of said called station to said communications terminal.

* * * * *